United States Patent
Sato et al.

(10) Patent No.: US 6,759,467 B2
(45) Date of Patent: *Jul. 6, 2004

(54) CURABLE FLUOROPOLYETHER BASE RUBBER COMPOSITIONS

(75) Inventors: Makoto Sato, Matsuida-machi (JP); Yasuhisa Osawa, Matsuida-machi (JP); Shinichi Sato, Matsuida-machi (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 09/897,479

(22) Filed: Jul. 3, 2001

(65) Prior Publication Data

US 2002/0019483 A1 Feb. 14, 2002

(30) Foreign Application Priority Data

Jul. 5, 2000 (JP) ......................................... 2000-204049

(51) Int. Cl.$^7$ ........................... C08K 3/36; C08L 83/05; C08L 27/12
(52) U.S. Cl. ....................... 524/493; 524/492; 524/567; 524/588
(58) Field of Search ................................ 524/492, 493, 524/567, 588; 528/15, 25, 29, 31

(56) References Cited

U.S. PATENT DOCUMENTS

| | | | | |
|---|---|---|---|---|
| 2,727,876 A | * | 12/1955 | Iler | |
| 2,806,012 A | * | 9/1957 | Allen | |
| 3,658,749 A | * | 4/1972 | Gordon | 523/212 |
| 4,307,023 A | * | 12/1981 | Ettlinger et al. | 106/483 |
| 4,442,060 A | * | 4/1984 | Bouverot et al. | 264/328.2 |
| 4,690,967 A | * | 9/1987 | LaGarde et al. | 524/183 |
| 5,656,711 A | * | 8/1997 | Fukuda et al. | 528/15 |
| 5,665,846 A | * | 9/1997 | Sato et al. | 528/15 |
| 6,127,504 A | * | 10/2000 | Fukuda et al. | 525/478 |
| 6,414,062 B1 | * | 7/2002 | Fukuda et al. | 524/261 |

* cited by examiner

*Primary Examiner*—Jeffrey B. Robertson
(74) *Attorney, Agent, or Firm*—Millen, White, Zelano & Branigan, P.C.

(57) ABSTRACT

A liquid fluoropolyether base rubber composition comprising (A) a linear fluoropolyether compound containing at least two alkenyl groups and having a perfluoroalkyl ether structure in its backbone, (B) a silica filler having a specific surface area of at least 100 m$^2$/g and a bulk density of 100–200 g/l, (C) a curing amount of an organosilicon compound having at least two silicon-bound hydrogen atoms, and (D) a hydrosilylation catalyst is unlikely to thicken despite filler loading, is suitable for liquid injection molding and curable into products having improved mechanical properties as well as water repellency, oil repellency, solvent resistance, chemical resistance and weather resistance.

17 Claims, No Drawings

CURABLE FLUOROPOLYETHER BASE RUBBER COMPOSITIONS

This invention relates to a curable fluoropolyether base rubber composition which is suited for liquid injection molding and cures into products having improved mechanical properties.

BACKGROUND OF THE INVENTION

In the prior art, linear fluoropolyether compounds containing at least two alkenyl groups per molecule and having a perfluoroalkyl ether structure in their backbone are used in a variety of applications owing to the excellent characteristics of the perfluoroalkyl ether structure. While silica fillers including dry silica (known as fumed silica) and wet silica (known as precipitated silica) are commonly used in silicone rubber for reinforcement purposes, it is known that blending such silica filler in the curable fluoropolyether base rubber can remarkably improve the mechanical properties of the cured product thereof. The blending of silica filler provides fluoropolyether base rubber compositions with a good balance of heat resistance, chemical resistance, solvent resistance, water repellency, oil repellency, and weather resistance. The resultant compositions perform well in most applications.

However, a problem arises in molding such rubber materials. When O-rings and diaphragms for use in semiconductor parts and hard disks are to be molded, liquid injection molding (LIM) featuring mass-scale productivity is often used. A limit is imposed on the viscosity of liquid rubber materials which can be molded. This, in turn, imposes a limit on the permissible loading of reinforcing silica. It is then difficult to find a compromise between good mechanical strength and ease of liquid injection molding.

SUMMARY OF THE INVENTION

An object of the invention is to provide a liquid curable fluoropolyether base rubber composition which is amenable to liquid injection molding and cures into products having improved mechanical properties.

The present invention provides a curable fluoropolyether base rubber composition comprising (A) 100 parts by weight of a linear fluoropolyether compound containing at least two alkenyl groups in a molecule and having a perfluoroalkyl ether structure in its backbone, (B) 10 to 50 parts by weight of a silica filler having a specific surface area of at least 100 m$^2$/g and a bulk density of 100 to 200 g/l, (C) an effective amount to cure component (A) of an organosilicon compound having at least two hydrogen atoms each bound to a silicon atom in a molecule, and (D) a catalytic amount of a hydrosilylation catalyst. This fluoropolyether base rubber composition is prevented from a viscosity rise due to filler loading, is amenable to liquid injection molding, and cures into products having improved mechanical properties.

DESCRIPTION OF THE PREFERRED EMBODIMENTS

The respective components of the curable fluoropolyether base rubber composition are described below.

(A) Linear Fluoropolyether Compound

The linear fluoropolyether compound used herein as a base polymer in the composition is one containing at least two alkenyl groups in a molecule and having a divalent perfluoroalkyl ether structure in its backbone.

The alkenyl groups in the linear fluoropolyether compound are those having a $CH_2=CH-$ structure at an end such as vinyl, allyl, propenyl, isopropenyl, butenyl and hexenyl, with the vinyl and allyl being especially preferred. The alkenyl groups may be attached either directly to both ends of the backbone of the linear fluoropolyether compound or to the backbone through a divalent linking group such as $-CH_2-$, $-CH_2O-$ or $-Y-NR-CO-$. Herein Y is $-CH_2-$ or a group of the following structural formula:

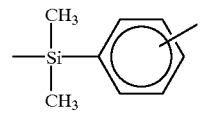

(the bond may be at o, m or p-position) and R is hydrogen, methyl, phenyl or allyl.

The perfluoroalkyl ether structure in the linear fluoropolyether compound includes those of the following general formula:

$-(Rf-O)_q-$ wherein Rf is a straight or branched perfluoroalkylene group of 1 to 6 carbon atoms, preferably 1 to 3 carbon atoms, and letter q is an integer of 1 to 500, preferably 2 to 400, more preferably 10 to 200.

Examples of the recurring units $-(Rf-O)-$ are shown below.

$-CF_2O-$, $-CF_2CF_2O-$, $-CF_2CF_2CF_2O-$,
$-CH(CF_3)CF_2O-$, $-CF_2CF_2CF_2CF_2O-$,
$-CF_2CF_2CF_2CF_2CF_2CF_2O-$, and $-C(CF_3)_2-$.

Of these, $-CF_2O-$, $-CF_2CF_2O-$, $-CF_2CF_2CF_2O-$, and $-CH(CF_3)CF_2O-$ are preferred. It is understood that the perfluoroalkyl ether structure may consist of recurring units $-(Rf-O)-$ of one type or recurring units of two or more types.

Typical of the linear fluoropolyether compound (A) are those of the following general formula (1).

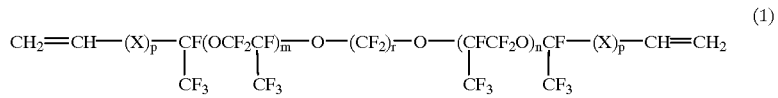

In formula (1), X is independently selected from among —CH$_2$—, —CH$_2$O— and —Y—NR—CO—, letter p is independently equal to 0 or 1, r is an integer of 2 to 6, and m and n are integers of 0 to 200, preferably 5 to 100. Y is —CH$_2$— or a group of the following structural formula:

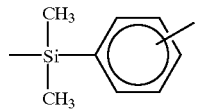

(the bond may be at o, m or p-position), and R is hydrogen, methyl, phenyl or allyl. These linear fluoropolyether compounds have a molecular weight of about 400 to 100,000 and preferably about 1,000 to 50,000.

Illustrative examples of the linear fluoropolyether compound of formula (1) are given below. In the following formulae, m and n are as defined above.

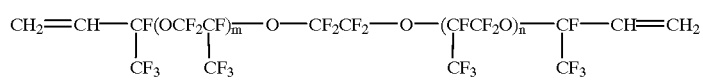

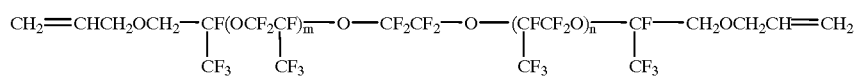

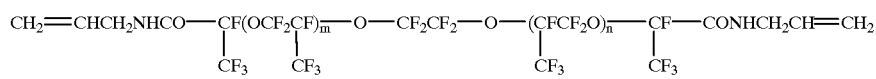

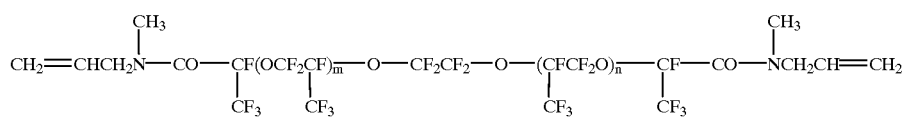

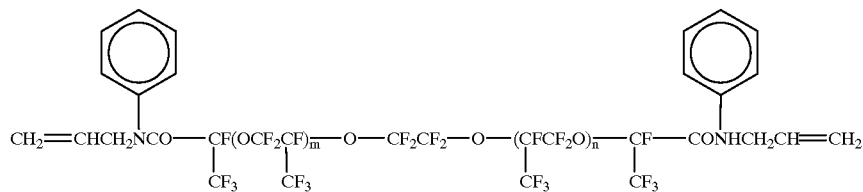

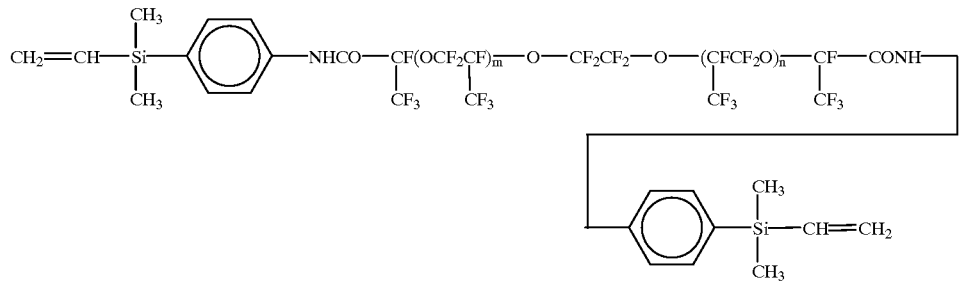

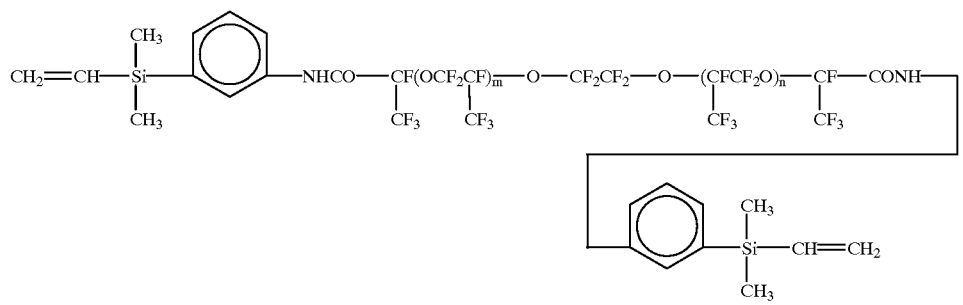

-continued

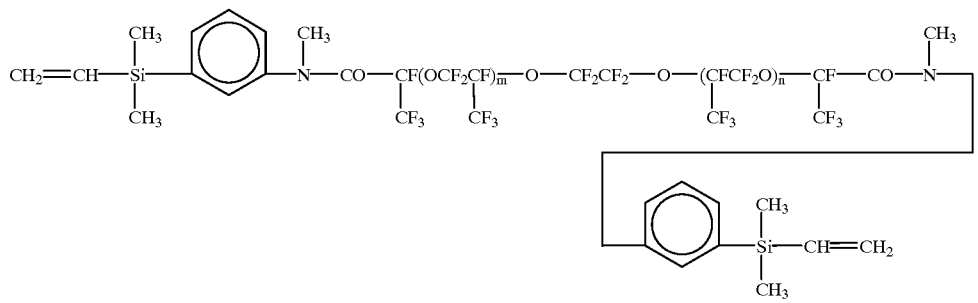

These linear fluoropolyether compounds may be used alone or in admixture of two or more.

(B) Silica Filler

The filler (B) used for the reinforcement of the curable fluoropolyether base rubber composition is particulate silica. It should have a specific surface area of at least 100 m²/g as measured by the hydrogen adsorption BET method. From the molding standpoint, the silica filler should have a bulk density of 100 to 200 g/l, and preferably 130 to 160 g/l, in order to prevent the composition from increasing its viscosity as a result of blending of the silica filler. Too low a bulk density detracts from reinforcement effects whereas too high a bulk density results in thickening.

The silica filler may be either dry silica known as fumed silica or wet silica known as precipitated silica. The silica filler may be treated with organochlorosilanes, silazane compounds and cyclic silazane compounds which react with hydroxyl groups attached to silicon atoms on silica surfaces. Alternatively, the silica filler may be hydrophobized on the surface with dimethylpolysiloxanes having a low degree of polymerization.

An appropriate amount of the silica filler (B) blended is 10 to 50 parts, and preferably 15 to 30 parts by weight per 100 parts by weight of component (A). Less than 10 parts of component (B) fails to achieve sufficient reinforcement whereas more than 50 parts of component (B) invites an excessive rise of viscosity and is difficult to compound.

(C) Organosilicon Compound

The organosilicon compound (C) functions as a crosslinking agent and chain extender for component (A). Any organosilicon compound is useful as long as it has at least two hydrogen atoms each bound to a silicon atom, that is, hydrosilyl (SiH) groups in a molecule. With the compatibility with and dispersibility in component (A), and uniformity after curing taken into account, organosilicon compounds having at least one monovalent perfluorooxyalkyl group, monovalent perfluoroalkyl group, divalent perfluorooxyalkylene group or divalent perfluoroalkylene group as well as at least two, preferably at least three hydrosilyl groups (or SiH groups) are preferred.

The perfluorooxyalkyl, perfluoroalkyl, perfluorooxyalkylene and perfluoroalkylene groups include the groups of the following general formulae.

monovalent perfluoroalkyl groups:

$C_mF_{2m+1}$— m is an integer of 1 to 20, preferably 2 to 10.

divalent perfluoroalkylene groups:

—$C_mF_{2m}$— m is an integer of 1 to 20, preferably 2 to 10.

monovalent perfluorooxyalkyl groups:

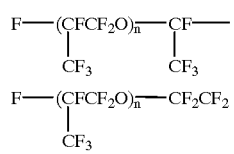

n is an integer of 1 to 5. divalent perfluorooxyalkylene groups:

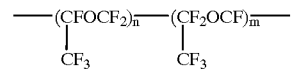

m is an integer of 1 to 50, n is an integer of 1 to 50, and m+n is an integer of 2 to 100.

—$(CF_2O)_m$—$(CF_2CF_2O)_n$—$CF_2$— m and n each are an integer of 1 to 50.

These perfluoro(oxy)alkyl and perfluoro(oxy)alkylene groups each may be attached either directly to a silicon atom or to a silicon atom through a divalent linking group. The divalent linking group is an alkylene group, arylene group or a mixture thereof, which may further have an ether bond oxygen atom, amide bond or carbonyl bond. Such divalent linking groups of 2 to 12 carbon atoms are preferred. Illustrative examples thereof include —$CH_2CH_2$—,  —$CH_2CH_2CH_2$—,
—$CH_2CH_2CH_2OCH_2$—,
—$CH_2CH_2CH_2$—NH—CO—, —$CH_2CH_2CH_2$—N(Ph)—CO—,
—$CH_2CH_2CH_2$—N($CH_3$)—CO—, and
—$CH_2CH_2CH_2$—O—CO— wherein Ph is phenyl.

In addition to the monovalent organic group containing a monovalent or divalent fluorinated substituent, that is, a perfluoroalkyl, perfluorooxyalkyl, perfluoroalkylene or perfluorooxyalkylene group, the organosilicon compound (C) may have a monovalent substituent attached to a silicon atom. Exemplary monovalent substituents are substituted or unsubstituted hydrocarbon groups of 1 to 20 carbon atoms including alkyl groups such as methyl, ethyl, propyl, butyl, hexyl, cyclohexyl, octyl and decyl; alkenyl groups such as vinyl and allyl; aryl groups such as phenyl, tolyl, and naphthyl; aralkyl groups such as benzyl and phenylethyl; and substituted ones of these groups in which some of the hydrogen atoms are replaced by chlorine atoms, cyano groups or the like, such as chloromethyl, chloropropyl, and cyanoethyl.

The organosilicon compound (C) may be cyclic, chainlike or three-dimensional network. The number of silicon atoms in the molecule of the organosilicon compound is not critical although it desirably has about 2 to about 60 silicon atoms, and especially about 3 to about 30 silicon atoms.

Illustrative examples of the organosilicon compound are given below. They may be used alone or in admixture of two or more. In the formulae, Me is methyl and Ph is phenyl.

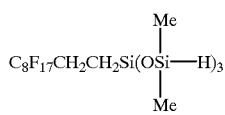

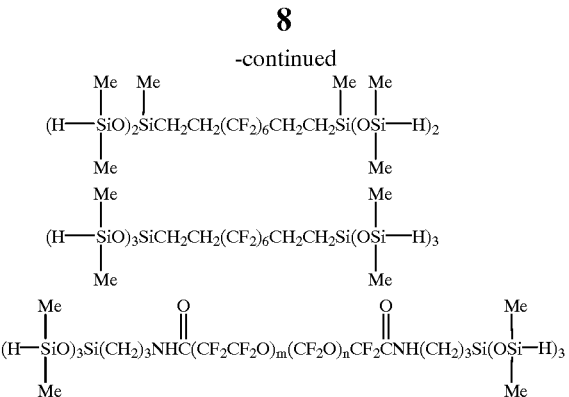

Note that m is an integer of 1 to 20, averaging to 10, and n is an integer of 1 to 10, averaging to 6.

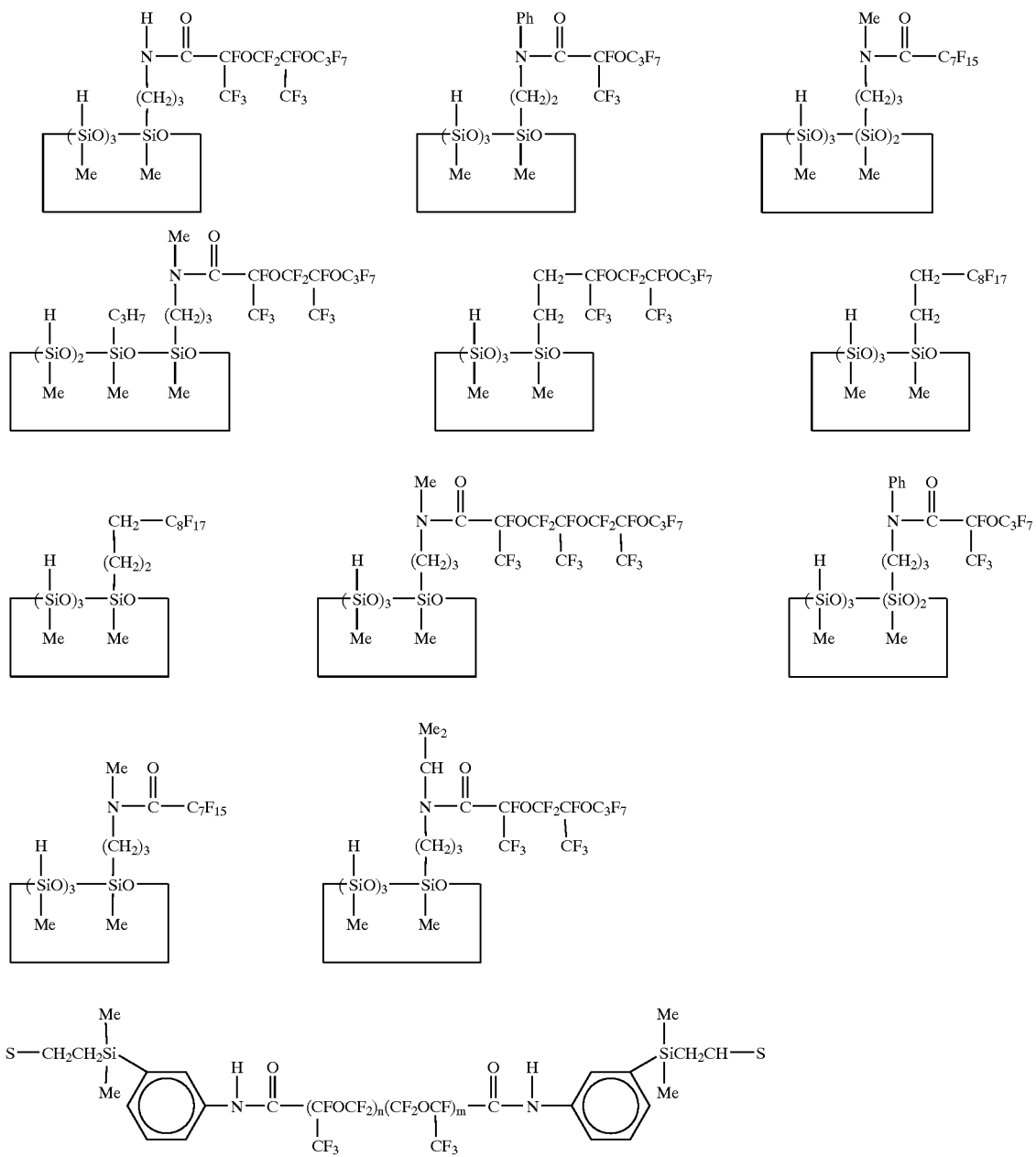

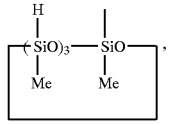

Note that S is n is an integer of 1 to 30, m is an integer of 1 to 30, and n+m is 2 to 60, averaging to 2 to 50.

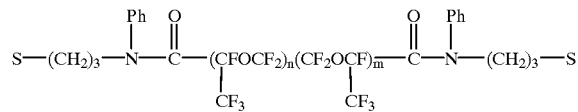

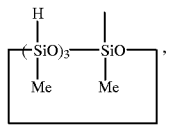

Note that S is n is an integer of 1 to 30, m is an integer of 1 to 30, and n+m is 2 to 60, averaging to 2 to 50.

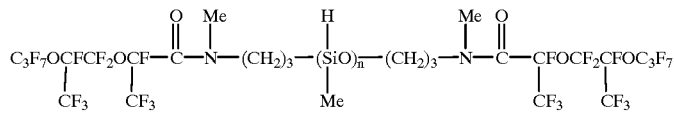

Note that n is an integer of 1 to 60, averaging at 3 to 50.

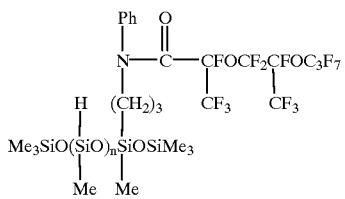

Note that n is an integer of 1 to 60, averaging at 3 to 50.

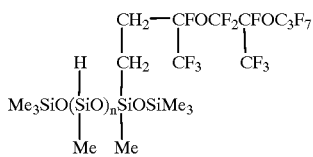

Note that n is an integer of 1 to 60, averaging at 3 to 50.

Component (C) is blended in an effective amount to cure component (A). Usually, component (C) having hydrosilyl groups is blended in such an amount that preferably 0.5 to 5 mol, and more preferably 1 to 2 mol of hydrosilyl groups (or SiH) groups may be present per mol of alkenyl groups (e.g., vinyl, allyl or cycloalkenyl) in the entire composition, especially component (A). Less amounts of component (C) may achieve an insufficient degree of crosslinking. Excessive amounts of component (C) may allow chain lengthening to become preferential, inviting short cure, foaming, and losses of heat resistance and compression set. More particularly, the amount of component (C) blended is usually 0.1 to 50 parts by weight per 100 parts by weight of component (A).

(D) Hydrosilylation Catalyst

The hydrosilylation catalyst (D) is preferably selected from transition metals, for example, platinum group metals such as Pt, Rh and Pd, and compounds of transition metals. Most of these compounds are noble metal compounds which are expensive. Platinum compounds are thus used because they are readily available.

Exemplary platinum compounds include chloroplatinic acid, complexes of chloroplatinic acid with olefins such as ethylene, complexes of chloroplatinic acid with alcohols and vinylsiloxanes, and platinum supported on silica, alumina or carbon though not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$ wherein Ph denotes phenyl.

The amount of the catalyst used is not critical. A catalytic amount can achieve a desired curing rate. The catalytic amount varies depending on the form and concentration of the catalyst, that is, whether or not the catalyst is supported on a carrier such as silica or alumina and whether or not the catalyst is diluted with a solvent. From the economical aspect and to obtain satisfactory cured products, the platinum group metal compound is preferably added in an amount of 0.1 to 1,000 parts, more preferably 0.1 to 500 parts by weight calculated as the platinum group metal per million parts by weight of the entire curable composition.

Other Components

Insofar as the benefits of the invention are not impaired, various well-known additives may be added to the inventive composition in addition to the above essential components (A) to (D). Such optional additives include regulators of the hydrosilylation catalyst, for example, acetylene alcohols such as 1-ethyl-1-hydroxycyclohexane, 3-methyl-1-butyn-3-ol, 3,5-dimethyl-1-hexyn-3-ol, 3-methyl-1-penten-3-ol, and phenylbutynol, as well as 3-methyl-3-penten-1-yn and 3,5-dimethyl-3-hexen-1-yn; tackifiers, for example, organosiloxanes having alkoxy, epoxy or SiH groups in the molecule such as the compound shown below; pigments such as iron oxide, cerium oxide and carbon black; colorants, dyes, and antioxidants.

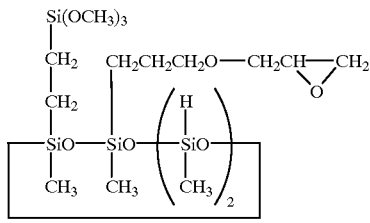

Depending on its application, the rubber composition of the invention is formulated as a single composition having all the essential components (A) to (D) incorporated therein, that is, of one part type. Alternatively, the rubber composition is formulated to two part type, for example, one part containing a part of (A), a part of (B) and (C) and the other part containing the balance of (A), the balance of (B) and (D) whereupon the two parts are mixed on use.

The composition thus obtained is liquid and should preferably have a viscosity of 50 to 2,000 Pa·s at 25° C., especially 200 to 1,000 Pa·s at 25° C., as measured according to JIS K7117. A viscosity outside the range may impede molding.

The composition of the invention will cure when it is allowed to stand at room temperature or by heating. Often, the composition is preferably cured by heating at a temperature from room temperature (e.g., 10–30° C.) to about 180° C. for about 5 minutes to about 24 hours.

The composition of the invention can be molded by any conventional method although the well-known liquid injection molding technique is advantageously applicable to the composition having a viscosity within the above-defined range.

The curable fluoropolyether base rubber compositions cure into products having significantly improved mechanical properties as well as water repellency, oil repellency, solvent resistance, chemical resistance, and weather resistance. Thus the compositions are useful in a wider variety of applications and suitable for use as molded rubber parts such as diaphragms and sealing parts (e.g., O-rings, gaskets and grommets) where chemical resistance and oil resistance are required when such parts are used in chemical plants, business machines (e.g., copiers and printers), automotive and aircraft, semiconductor devices, medical equipment, analytic instruments, etc.

EXAMPLE

Examples of the invention are given below by way of illustration and not by way of limitation. All parts are by weight. The viscosity is a measurement at 250° C.

Example 1

To 100 parts of a polymer of formula (2) shown below (viscosity 4.4 Pa·s, average molecular weight 16500, and vinyl content 0.012 mol/100 g) was added 40 parts of hexamethylsilazane-treated silica (specific surface area 170 m²/g and bulk density 140 g/l) as the silica filler. They were mixed in a kneader, milled for one hour, then heat treated at 170° C. for 2 hours, obtaining Base 1. In a planetary mixer, this Base 1 was diluted and mixed with the polymer of formula (2) in such amounts that the weight ratio of the polymer of formula (2) to the treated silica was 100/30. The mixture was further milled on a three-roll mill, obtaining Base 2.

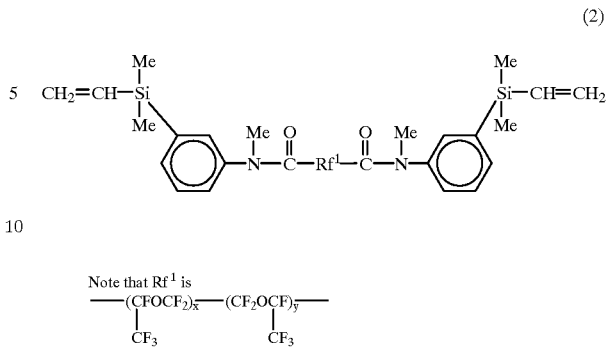

wherein x+y=97 (average) and Me is methyl.

In this example, the composition was formulated as two-part type consisting of Parts A and B shown below.

Preparation of Part A

To 130 parts of Base 2 was added 0.4 part of a toluene solution of a catalyst in the form of chloroplatinic acid modified with a compound of the following formula (3) (platinum concentration 0.5 wt %). Intimate mixing gave Part A.

Preparation of Part B

To 140 parts of Base 2 were added 0.8 part of a 50% toluene solution of ethynyl cyclohexanol and 6.71 parts of a SiH group-bearing organosilicon compound of the following formula (4). Intimate mixing gave Part B.

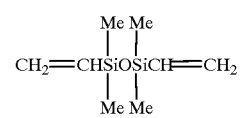

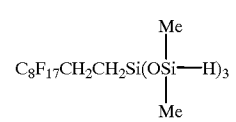

Parts A and B of the liquid fluoropolyether composition were measured for viscosity according to JIS K7117. The results are shown in Table 1.

Table 2 shows rubber physical properties of the two-part composition. A measurement sample was prepared by blending Parts A and B in a weight ratio of 1:1, intimately mixing them in vacuum, press molding into a sheet at 150° C. for 10 minutes, and post-curing the sheet in an oven at 200° C. for 4 hours. Physical properties of the cured rubber were measured according to JIS K6251 and K6253.

Comparative Example 1

To 100 parts of the polymer of formula (2) shown above (viscosity 4.4 Pa·s, average molecular weight 16500, and vinyl content 0.012 mol/100 g) was added 40 parts of hexamethylsilazane-treated silica (specific surface area 170 m²/g and bulk density 50 g/l) as the silica filler. They were mixed in a kneader, milled for one hour, then heat treated at 170° C. for 2 hours, obtaining Base 3. In a planetary mixer, this Base 3 was diluted and mixed with the polymer of formula (2) in such amounts that the weight ratio of the polymer of formula (2) to the treated silica was 100/30. The mixture was further milled on a three-roll mill, obtaining Base 4.

Parts A and B were prepared as in Example 1 except that Base 4 was used instead of Base 2.

Parts A and B of the liquid fluoropolyether composition were measured for viscosity according to JIS K7117. The results are also shown in Table 1.

Table 2 shows rubber physical properties of the two-part composition. A measurement sample was prepared by blending Parts A and B in a weight ratio of 1:1, intimately mixing them in vacuum, press molding into a sheet at 150° C. for 10 minutes, and post-curing the sheet in an oven at 200° C. for 4 hours. Physical properties of the cured rubber were measured according to JIS K6251 and K6253.

TABLE 1

|  | Viscosity* (Pa · s) | |
| --- | --- | --- |
|  | Part A | Part B |
| Example 1 | 630 | 480 |
| CE1 | 2160 | 5340 |

*Brookfield viscometer

TABLE 2

|  | Rubber physical properties | | |
| --- | --- | --- | --- |
|  | Hardness (Durometer Type A) | Tensile strength (Mpa) | Elongation at break (%) |
| Example 1 | 51 | 10.8 | 480 |
| CE1 | 49 | 9.6 | 390 |

It is evident from Tables 1 and 2 that compositions loaded with a silica filler having a specific surface area of at least 100 m²/g and a bulk density of 100 to 200 g/l according to the invention are prevented from viscosity rise due to filler loading, suited for liquid injection molding, and give cured parts having improved mechanical properties.

There has been described a curable fluoropolyether base rubber composition which is restrained from increasing viscosity due to filler loading, is liquid injection moldable and cures into products having improved mechanical properties. The cured products possess water repellency, oil repellency, solvent resistance, chemical resistance and weather resistance inherent to fluoropolyether base rubber.

Japanese Patent Application No. 2000-204049 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable fluoropolyether base rubber composition comprising:

(A) 100 parts by weight of linear fluoropolyether compound containing at least two alkenyl groups in a molecule and having a perfluoroalkyl ether structure in its backbone, (B) 10 to 50 parts by weight of a silica filler having a specific surface area of at least 100 m²/g and a bulk density of 100 to 200 g/l, (C) an effective amount to cure component (A) of an organosilicon compound having at least two hydrogen atoms each bound to a silicon atom in a molecule, and (D) a catalytic amount of a hydrosilylation catalysts wherein said composition has a viscosity of 50 to 2,000 Pa's at 25° C.

2. The composition of claim 1 wherein the linear fluoropolyether compound (A) is of the following general formula (1):

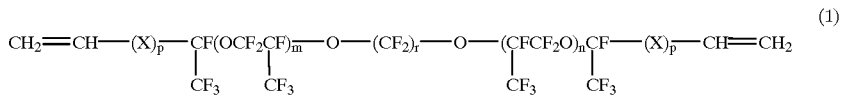

wherein X is independently —CH$_2$—, —CH$_2$O— or —Y—NR—CO— wherein Y is —CH$_2$— or a group of the following structural formula:

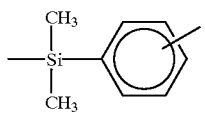

and R is hydrogen, methyl, phenyl or allyl, letter p is independently equal to 0 or 1, r is an integer of 2 to 6, and m and n each are an integer of 0 to 200.

3. A method for preparing a molded or extruded part comprising liquid injection molding of the composition according to claim 1.

4. The fluoropolyether base rubber composition according to claim 1, wherein said silica filler has a bulk density of 130 to 160 g/l.

5. The fluoropolyether base rubber composition according to claim 1, wherein said organosilicon compound has about 2 to about 60 silicon atoms.

6. The fluoropolyether base rubber composition according to claim 5, wherein said organosilicon compound has about 3 to about 30 silicon atoms.

7. The fluoropolyether base rubber composition according to claim 1, wherein said component (C) is blended in such an amount that 0.5 to 5 mol of hydrosilyl groups are present per mol of alkenyl groups.

8. The fluoropolyether base rubber composition according to claim 7, wherein said component (C) is blended in such an amount that 1 to 2 mol of hydrosilyl groups are present per mol of alkenyl groups.

9. The fluoropolyether base rubber composition according to claim 1, wherein said hydrosilylation catalyst is a transition metal.

10. The fluoropolyether base rubber composition according to claim 9, wherein said transition metal is selected from the group consisting of:

Pt, Rh, Pd, and a compound of a transition metal.

11. The fluoropolyether base rubber composition according to claim 10, wherein said compound of a transition metal is chloroplatimc acid, a complex of chlorplatinic acid with an olefin, a complex of chloroplatinic acid with alcohols and vinylsiloxanes, or platinum supported on silica, alumina or carbon.

12. The fluoropolyether base rubber composition according to claim 1, comprising an additional additive.

13. The fluoropolyether base rubber composition according to claim 12, wherein said additive is a regulator of a hydrosilylation catalyst, a tackifier, a pigment, a colorant, a dye or an antioxidant.

14. The fluoropolyether base rubber composition according to claim 13, wherein said regulator of a hydrosilylation catalyst is selected from the group consisting of 1-ethyl-1-hydroxycyclohexane, 3-methyl-1-butyn-3-ol, 3,5-dimethyl-1-hexyn-3-ol, 3-methyl-1-penten-3-ol, phenylbutynol, 3-methyl-3-penten-1-yn, and 3,5-dimethyl-3-hexen-1-yn.

15. The fluoropolyether base rubber composition according to claim 13, wherein said tackifier is an organosiloxane having an alkoxy, an epoxy or a SiH group.

16. The fluoropolyether base rubber composition according to claim 13, wherein said pigment is iron oxide, cerium oxide or carbon black.

17. The fluoropolyether base rubber composition according to claim 1, wherein said composition is cured at room temperature or by heating at a temperature to about 180° C. for about 5 minutes to about 24 hours.

* * * * *